(No Model.)
C. A. JOHNSON.
WATCH BALANCE STAFF AND BEARING.
No. 516,539. Patented Mar. 13, 1894.
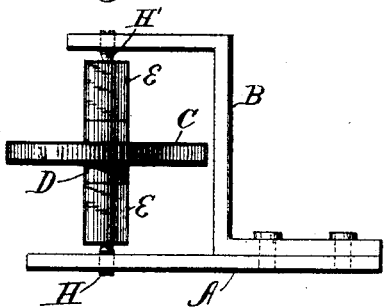
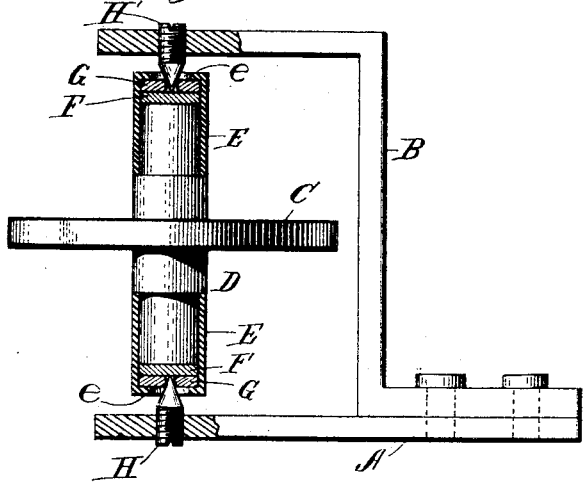
WITNESSES:
Charley A. Johnson INVENTOR
BY
Crosby and Dorian, ATTORNEYS

UNITED STATES PATENT OFFICE.

CHARLEY A. JOHNSON, OF ELLIS, KANSAS.

WATCH-BALANCE STAFF AND BEARING.

SPECIFICATION forming part of Letters Patent No. 516,539, dated March 13, 1894.

Application filed April 22, 1893. Serial No. 471,416. (No model.)

*To all whom it may concern:*

Be it known that I, CHARLEY A. JOHNSON, a citizen of the United States, residing at Ellis, in the county of Ellis and State of Kansas, have invented certain new and useful Improvements in Watch - Balance Staffs and Bearings Therefor; and I do hereby declare the following to be a full, clear, and exact description of the invention, such as will enable others skilled in the art to which it appertains to make and use the same.

This invention relates to an improvement in watch balance staffs and bearings therefor and it consists in the construction and arrangement of parts hereinafter described and definitely pointed out in the claims.

The aim and purpose of this invention is the provision of an improved balance staff whereby an easy and accurate adjustment can be had and a replacement of the supporting journals can be quickly made and accurately applied with but little trouble.

To this end the invention consists in the construction illustrated in the accompanying drawings wherein like letters of reference indicate corresponding parts in both views and in which—

Figure 1 is a side elevation and Fig. 2 is a sectional elevation taken through the shaft.

In the drawings A represents the support and B the bracket arm between which the balance wheel C is placed. The wheel C is mounted on a shaft D the outer ends of which are reduced in circumference and the extreme ends are blunt and are of the same circumference as that of the reduced portion. On the reduced portions of the shaft are sleeved the bearing boxes E closely fitting thereon and formed with turned in or flanged outer ends as at *e*. Within these bearings and abutting against the ends of the shafts are the cap jewels F and between the cap jewels and flanges at the ends of the boxes are the hole jewels G. These jewels occupy the entire space between the flanges of the boxes and ends of the shaft and are held in position by the boxes snugly fitting the shaft.

H and H' are the journaled pins the former passing through the support and the latter through the bracket arm the same being suitably screw threaded in threaded apertures formed in the support and arm whereby an easy lateral adjustment can be made. The ends of these pins are tapered and formed in conical bearing points which are fitted within the apertures of the hole jewels their points abutting against the cap jewels.

Heretofore in the repairing or replacement of balance staffs it has been very difficult and quite impossible to properly center the same and to otherwise so adjust them that a perfect movement of the balance wheel will be had. By my invention this objection is wholly overcome it being necessary to replace the journal pins only, which can be done with but little trouble and with the utmost precision. It is also evident that a replacement of the jewels can be made very quickly and with but little trouble.

It is evident that many minor changes in the construction and arrangement of the parts of my device can be made and substituted for those herein shown and described without in the least departing from the nature and principle of my invention.

Having thus described my invention, what I claim as new, and desire to secure by Letters Patent, is—

1. The combination with a balance staff, of jeweled bearings mounted in the ends thereof, a support and adjustable journal pins in the support having their ends extended into the bearings, substantially as described.

2. The combination with a balance staff, of journaled boxes formed on the ends thereof, capped jewels within the boxes, hole jewels within the outer ends of the boxes, means for securing the jewels in place, a support and pivot pins in the support having their inner ends extended into the apertures of the hole jewels, substantially as described.

3. In a watch balance staff, the combination with the staff, of journaled boxes removably secured on the outer ends thereof, jewels in the boxes, a support and pivot pins in the support having their ends extending into the bearings, substantially as described.

4. In a watch balance staff, the combination with the staff of removable bearings on the staff, a support and pivot pins in the support entering the bearings, substantially as described.

5. In a watch balance staff, the combination with the staff, of cylinders sleeved on the ends thereof and extending beyond the same, jeweled bearings in the ends of the cylinder against which the staff abuts, a support and pivot pins in the support engaging the bearings, substantially as described.

6. In a watch balance staff, the combination with the staff having reduced ends, of bearing sleeved on the ends consisting of cylinders having inwardly extending flanges on their outer ends and jewels interposed between the flanges and the ends of the shaft, a support and pivot pins removably secured in the support and projecting into the bearings, substantially as described.

In testimony whereof I affix my signature in presence of two witnesses.

CHARLEY A. JOHNSON.

Witnesses:
H. C. ERB,
GEO. JOHNSTON.